May 29, 1956 R. B. RALLS 2,747,925
ANTI-GLARE SCREEN HOLDER
Filed Dec. 18, 1952 3 Sheets-Sheet 3
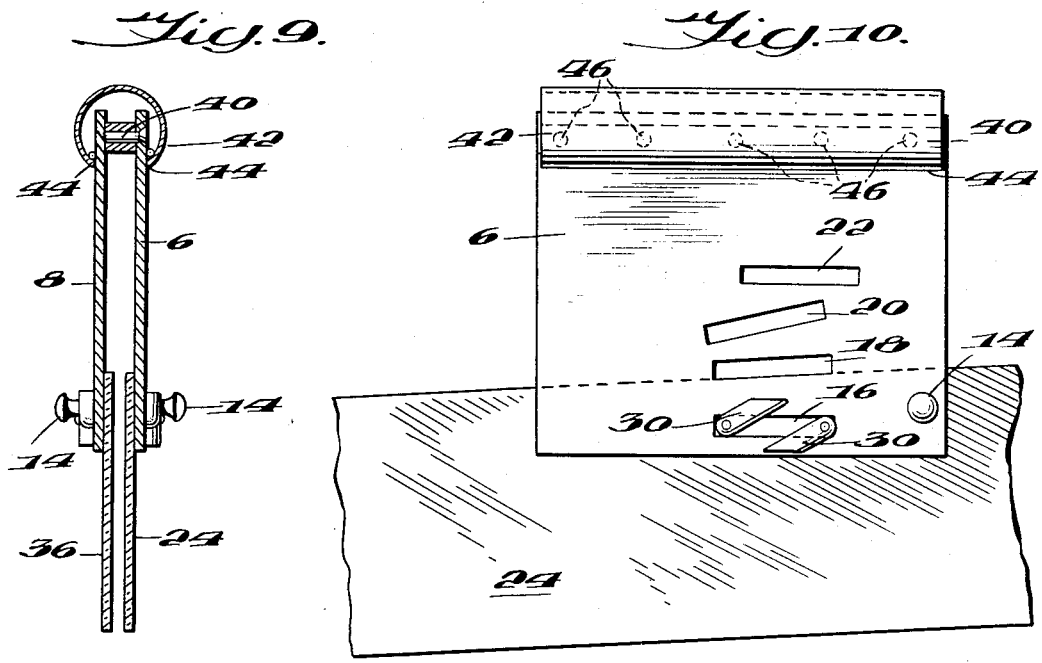
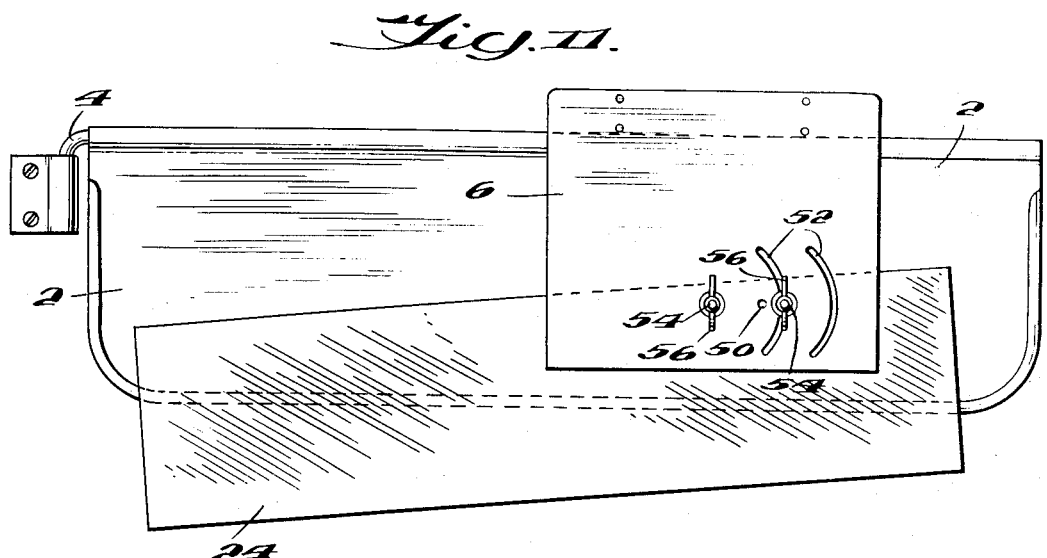
INVENTOR
ROBERT B. RALLS,
BY Fisher T Christen,
ATTORNEYS

United States Patent Office 2,747,925
Patented May 29, 1956

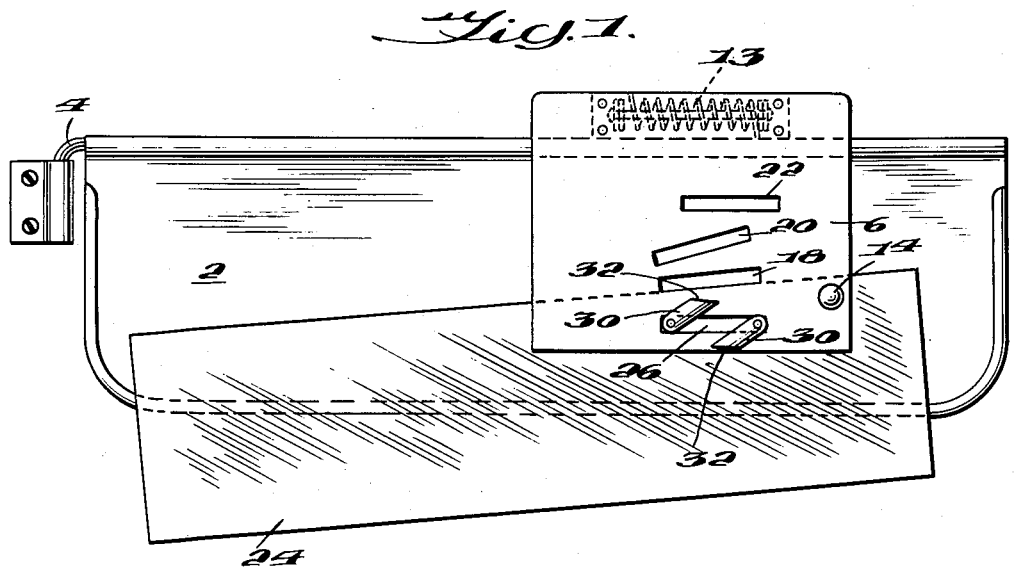
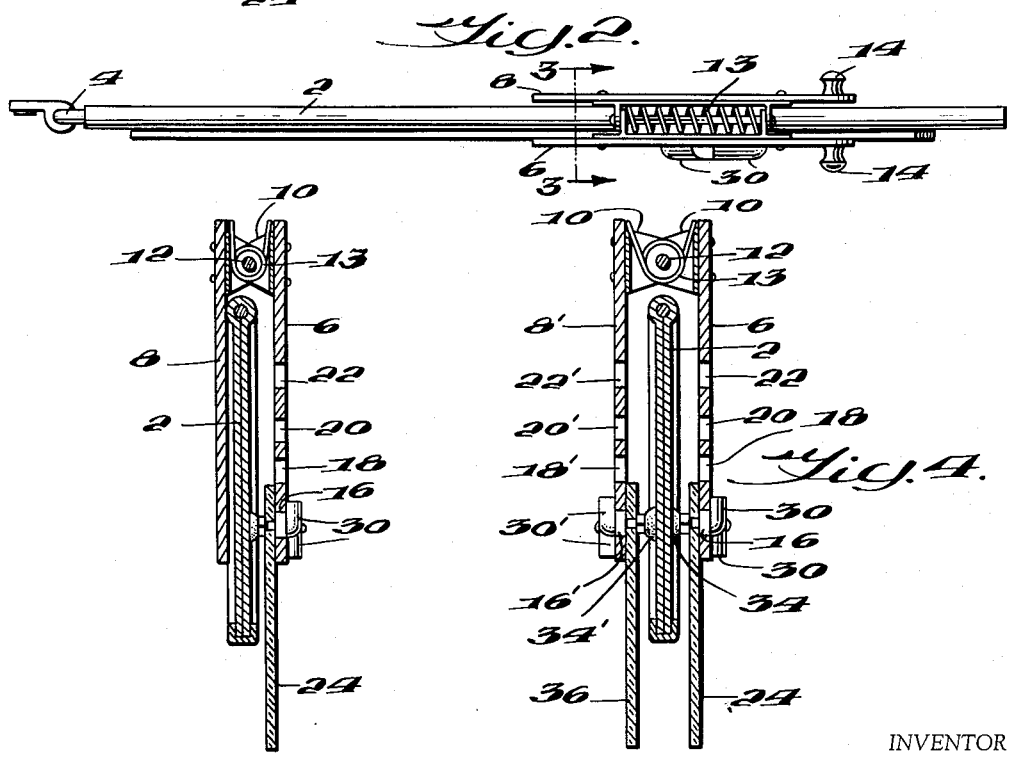

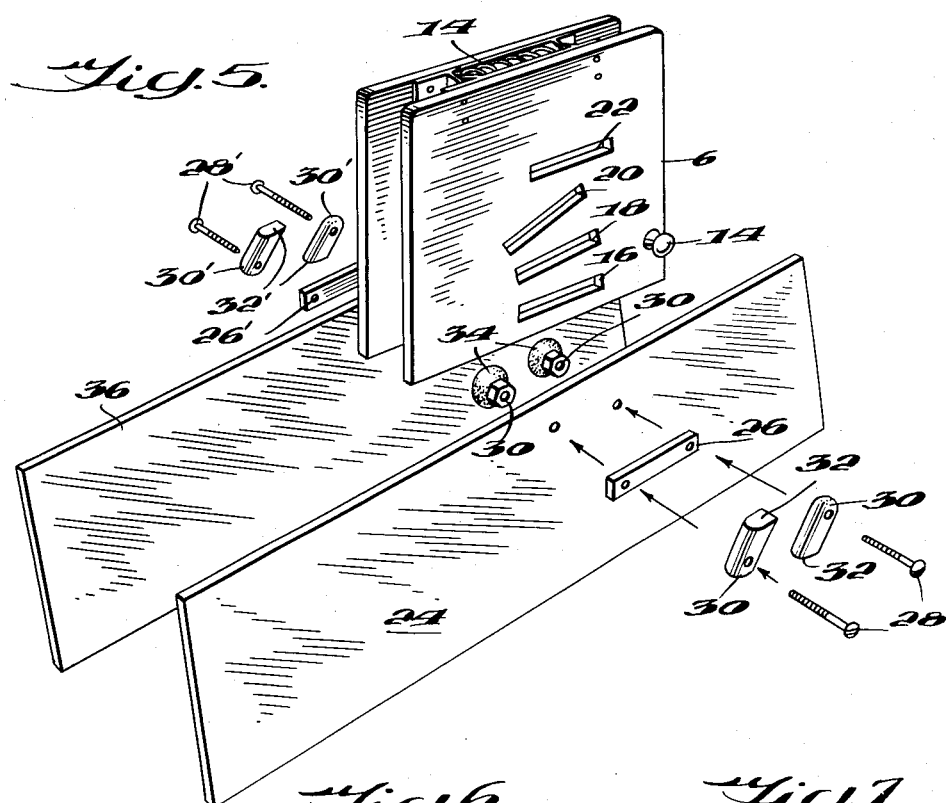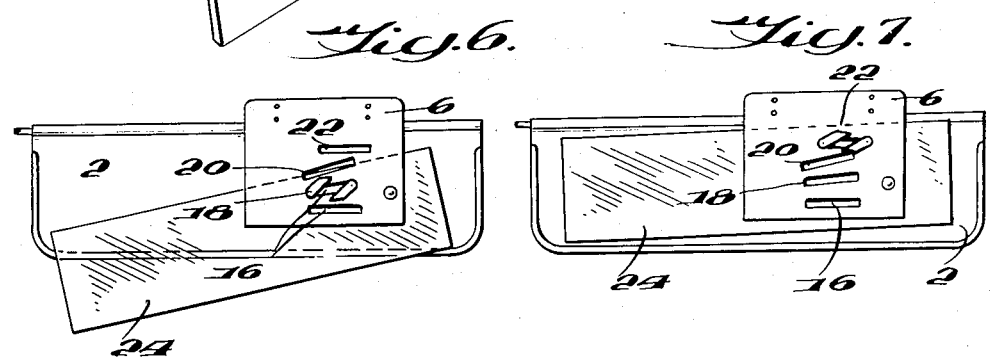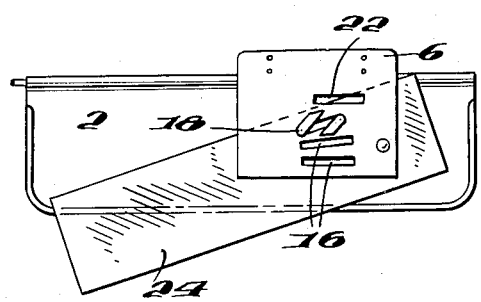

2,747,925

ANTI-GLARE SCREEN HOLDER

Robert B. Ralls, Tucson, Ariz.

Application December 18, 1952, Serial No. 326,721

15 Claims. (Cl. 296—97)

This invention is a holder for an anti-glare screen which is particularly adapted to be clamped to the usual sun visor, with which most automobiles are provided.

The principal object of the invention is to provide a holder of this character which may be clamped to or removed from the visor without making any change whatever in the visor and without requiring the formation of any holes or the like in the visor.

Another object of the invention is to provide a holder for an anti-glare screen which may be clamped to the upper edge of the visor and moved back and forth along the visor for positioning the anti-glare screen in any desired position, and particularly in a position for screening the left hand side of the road in line with the headlight glare, with the left hand edge of the road clear and visible and with the entire right lane on which the car is traveling also clear and visible.

Another object of the invention is to provide a mounting for the anti-glare screen, whereby the screen may be positioned at any desired level or angle to suit the particular driver and particular car in which the holder is used.

More particularly, the holder of the present invention comprises front and rear plates connected by spring hinge means at their upper edges, for urging the two plates toward each other, so that the two plates may be sprung apart manually, slipped over the top edge or end of the visor, the spring serving to cause both plates to press against the front and rear surfaces of the sun visor for positioning the holder at any desired point on the visor. The inner faces of these two plates may be provided with rubber buttons or the like for pressing against the front and rear faces of the visor for frictionally holding it in position.

The invention also comprises an improved manner of detachably securing the anti-glare screen at any desired angular position and at any desired level, on one of the plates of the holder. More specifically, both the front and rear plates of the holder may be provided with a plurality of slots arranged at different angles and different levels; the anti-glare screen is provided with a latching or clamping device for readily and quickly attaching the anti-glare screen in any desired slot, to suit the convenience of the driver.

This latching means preferably comprises a cleat which is carried by the anti-glare screen; this cleat projects through any of the slots in the holding plates. This cleat serves as a mounting means for a pair of rotatable latches or clamps which may be turned into registry with said cleat and, when so turned, the cleat and latches may be passed through any desired slot. When the cleat and latches are thus passed through the desired slot, the latches are turned manually to engage against the face of the plate, thereby holding the anti-glare screen in position in that particular slot.

In one aspect of the invention, the front plate of the holder may be provided with slots as described, and in another aspect of the invention such slots may be duplicated on the second or rear plate, so that if desired, a second anti-glare screen may be positioned at any desired height or angle on the second plate. Some drivers might prefer to use a second screen on the second plate, in case the optical density of the first plate is not sufficient to cut down the glare sufficiently; or two screens may be used on the same plate.

The two plates of the holder may be provided with small buttons or the like so that the user may readily spring them apart in positioning the holder on the sun visor.

While the anti-glare screen is particularly for use in driving at night, it is of course equally useful in daytime driving where the sunlight is unusually bright. The anti-glare screen can be made of any desired material or color, preferably amber or green colored plastic material.

The invention will now be described in more detail with the accompanying drawings wherein:

Figure 1 is a side elevation of the holder of the present invention positioned on the sun visor.

Figure 2 is a top view of Figure 1.

Figure 3 is a cross-section on the line 3—3 of Figure 2.

Figure 4 is a similar cross-section showing both plates provided with slots for holding the anti-glare screen.

Figure 5 is an exploded view showing the various elements of the invention before assembly.

Figures 6, 7 and 8 are views similar to Figure 1, showing the anti-glare screen in various positions.

Figure 9 is a vertical cross-section showing a modification.

Figure 10 is a front view of Fig. 9; and

Figure 11 is a front view of another modification.

Referring now to these drawings, 2 indicates the usual sun visor present in most motor cars, which is generally opaque and is mounted on a rod, the visor 2 being rotatable about the rod 4 to position it is the horizontal or inoperative position, in the vertical or operative position or at any desired angle between these positions.

The holder of the present invention comprises a front plate 6 and a rear plate 8, made of any desired material, preferably wood, fibre board, Masonite or the like.

These plates are provided with a spring hinge connection near their upper edges, comprising small brackets 10 carried by the plates in which is mounted a pivot pin 12 around which is coiled a helical spring 13 positioned to resiliently press the two plates toward each other. Each plate is provided with a button 14 whereby the user, by grasping these buttons, pulls the plates apart for slipping the holder over the visor and upon release thereof, the spring hinge or other spring device presses the plates against both faces of the visor 2. Hence it is evident that the holder may be positioned in any desired lateral position, with respect to the visor. The plates 6 and 8 are substantially coextensive and have a vertical width substantially as great as the vertical width of the visor 2, so as to provide a wide bearing on both sides of the visor and so as to be able to hold one or two anti-glare shields projecting well below the visor, as in Figs. 3 and 4.

Another form of spring mounting for the two plates 6 and 8 will be described in connection with Figures 9 and 10.

One of both plates 6 and 8 are provided with a plurality of slots 16, 18, 20 and 22, and more if desired, of the same size, positioned at various levels and at various angles, as shown, for example, in Figures 1 and 5.

The anti-glare screen 24, preferably of amber or green-colored transparent plastic, of the desired optical density, is detachably secured against the inner face of plate 6 as follows: A cleat 26 of the same thickness as the plate 6 and slightly smaller than the slots, is secured to the screen by bolts 28 passed through the cleat, through the screen and into nuts 30. The bolts 28 also pass, respectively, through a pair of turnable latches 30 beveled at opposite angles as at 32 so that when the beveled faces are in contact the latches 30 are in alinement and together are of the same length and width as the cleat 26, so that together with 26, they can be readily passed through any of the desired slot 16, 18, 20 or 22.

In order, therefore, to position screen 24 in any desired slot, the latches 30 are brought in line with the cleat 26 and both are passed through an appropriate slot in the plate 6 and then the latches are turned to the position shown in Figure 1 thereby holding the screen in position in the desired slot.

Suitably secured in any desired manner to the nuts 30 are rubber buttons or feet 34 which are adapted to press against the front face of the visor 2.

The back plate 8' may also be provided, as shown in Fig. 4, with a set of slots and with latching means as described in connection with the screen 24, corresponding parts being indicated by corresponding primed reference characters. This is for supporting a second anti-glare screen, such as 36.

In case the back plate 8 is not provided with a duplicate set of slots, its inner face may be provided with rubber buttons corresponding to the buttons 34 for pressing against the back face of the visor 2.

Figs. 6, 7, and 8 show the anti-glare screen in various positions, as determined by the particular slot 16, 18, 20 or 22, whichever is used. It should be understood that the particular slots shown are merely illustrative and that other slots in different positions may be used as desired.

Figure 9 shows a modification of the spring hinge connection between the plates 6 and 8. In this form, one of the plates such as 6, is provided with a transverse spacer strip 40, of plywood, for example, extending across near the top of 6 and secured thereto, but not secured to plate 8. The two strips are pressed toward each other by a partly cylindrical sheet metal spring 42 extending over and around the top edges of the plates, the lower edges 44 of the spring pressing against the plates, a strip or row of buttons 46 providing a ridge over which edges 44 engage so that the spring will not slip off. The two plates may readily be sprung apart by buttons 14 for placing the article over the sun visor 2 in any desired lateral position therein. Inside rubber buttons like 34, Figure 4, may be used if desired, for pressing against the sun visor.

In the modification in Figure 11, one or both plates 6 and 8 are provided with a plurality of holes 50 located in a horizontal row near the lower edge of the first plate 6. For each hole 50 there is a corresponding arcuate slot 52, with the corresponding hole as the center of the arc 52. Clamping means are provided for detachably clamping the screen 24 to plate 6, comprising headed screw bolts 54 passing through screen 24, and through a hole 50 and slot 52, and having wing nuts 56 on the screw bolts, whereby the screen 24 may be positioned at any desired angle on plate 6, lateral positioning of the holder being obtained by lateral movement of the holder on sun visor 2 as before.

Since the use of the slots permits the driver to position the anti-glare shield 24 or both shields 24 and 36 in any desired angular position and also at various levels, and since the holder may be positioned at any point horizontally on the sun visor 2, it is evident that a particular driver may position his anti-glare shield 24 or both shields 24 and 36, if a second one is used, in exactly the right place for screening the glare of approaching headlights and yet enable him to look to the left of the anti-glare screen for better visibility of the left hand edge of the road and for giving him clear vision in the right lane in which he is traveling, and a clear view of the right hand edge of the road so that there is no danger of his going into the ditch.

While the preferred embodiment of the invention has been described in detail, it should be understood that the invention is not to be limited to the exact details shown, but may be carried out in other ways.

I claim as my invention:

1. A holder for an anti-glare screen, comprising substantially coextensive front and rear plates, spring hinge means connecting said plates near their upper edges, and urging them toward each other, whereby the holder may be detachably clamped over the edge of the usual visor in a motor vehicle, each of said plates being provided with a slot therethrough; said plates having a vertical width substantially as great as the vertical width of the sun visor; two tinted, transparent anti-glare screens; and latching means, carried by said screens and projecting respectively through said slots and engageable with one face of the corresponding slotted plate, for holding said screens in position on their respective plates.

2. A holder for an anti-glare screen, comprising front and rear plates, spring means connecting said plates near their upper edges, and urging them toward each other, whereby the holder may be detachably clamped over the edge of the usual visor in a motor vehicle, one of said plates being provided with a plurality of slots therethrough at different angles; said slotted plate having a vertical width substantially as great as the vertical width of the sun visor; a tinted, transparent anti-glare screen; and latching means, carried by said screen and projecting through a selected slot in said slotted plate for positioning the screen in the desired angular position on said plate.

3. A holder for an anti-glare screen, comprising substantially coextensive front and rear plates, spring means connecting said plates near their upper edges, and urging them toward each other, whereby the holder may be detachably clamped over the edge of the usual visor in a motor vehicle, each of said plates being provided with a plurality of slots therethrough at different angles; said plates having a vertical width substantially as great as the vertical width of the sun visor; two tinted, transparent anti-glare screens; and latching means, carried by said screens and respectively projecting through a selected slot in the corresponding plate for positioning the screens in the desired angular position on its corresponding plate.

4. A holder for an anti-glare screen, comprising front and rear plates, spring hinge means connecting said plates near their upper edges, and urging them toward each other, whereby the holder may be detachably clamped over the edge of the usual visor in a motor vehicle, one of said plates being provided with a plurality of slots therethrough, positioned at different levels and at different angles; said slotted plate having a vertical width substantially as great as the vertical width of the sun visor; a tinted, transparent, anti-glare screen; and latching means, carried by said screen and projecting through a selected slot in said slotted plate, for attaching the screen in the desired position thereon.

5. A holder for an anti-glare screen, comprising substantially coextensive front and rear plates, spring hinge means connecting said plates near their upper edges, and urging them toward each other, whereby the holder may be detachably clamped over the edge of the usual visor in a motor vehicle, each of said plates being provided with a plurality of slots therethrough, positioned at different levels and at different angles; two tinted, transparent, anti-glare screens; and turnable latching means, carried by said screens and projecting respectively through a selected slot in its corresponding slotted plate, for attaching the screens in the desired position on said plates.

6. A holder for an anti-glare screen, comprising front and rear plates, spring hinge means connecting said plates at their upper edges, for urging them toward each other, one of said plates being provided with a slot; a tinted, transparent, anti-glare screen; and latching means for detachably securing said screen to said slotted plate, comprising a cleat adapted to fit into said slot, turnable latching elements adapted to aline with said slot and to pass therethrough; and bolts passing through the screen, through the cleat and through the latching elements, for mounting them in operative relation.

7. The combination as set forth in claim 6, wherein said turnable latching elements are made of resilient, non-metallic material which press against the screen when turned to positions transverse of the slot.

8. The combination as set forth in claim 6, wherein said latching elements are made of rubber and have their inner ends beveled for alinement with said slot and are adapted to press against the face of the screen when turned to positions transverse of said slot.

9. The combination as set forth in claim 6, further including resilient presser buttons positioned on the inner face of said slotted plate, adapted to engage against a sun visor.

10. The combination as set forth in claim 6, further including rubber buttons positioned on the inner faces of both of said plates, adapted to press against both front and back of a sun visor.

11. The combination as set forth in claim 6, further including buttons on the outside faces of both of said plates, for spreading apart the plates, against the pressure of said spring hinge, in placing the holder on, or removing it from, a sun visor.

12. The combination as set forth in claim 6, wherein said plates are provided with a plurality of slots in different positions therein, in any of which said latching means is engageable.

13. The combination as set forth in claim 6, wherein both plates are provided with slots in each of which an anti-glare screen provided with the described latching means may be mounted.

14. The combination as set forth in claim 6, wherein the slotted plate is provided with a plurality of slots in different angular positions for thereby mounting the anti-glare screen in different angular positions.

15. A holder for an anti-glare screen comprising front and rear plates, spring hinge means connecting said plates at their upper edges, for urging them toward each other, each of said plates being provided with a slot; two tinted, transparent, anti-glare screens; and latching means for detachably securing said screens to the corresponding plate, said latching means each comprising a cleat adapted to fit into its corresponding slot, turnable latching elements adapted to aline with its respective slot and to pass therethrough; and bolts respectively passing through the screens, through the cleats and through the latching elements, for mounting the screens on the respective plates.

References Cited in the file of this patent

UNITED STATES PATENTS

| | | |
|---|---|---|
| 1,052,676 | Lotz | Feb. 11, 1913 |
| 1,424,405 | Haughton | Aug. 1, 1922 |
| 1,775,486 | Clements | Sept. 9, 1930 |
| 1,980,916 | Greenfield | Nov. 13, 1934 |
| 2,184,360 | Nichols | Dec. 26, 1939 |
| 2,210,762 | Itzigson | Aug. 6, 1940 |
| 2,231,641 | Schwab | Feb. 11, 1941 |
| 2,541,614 | Rosenberger | Feb. 13, 1951 |
| 2,547,101 | Uttz | Apr. 3, 1951 |
| 2,603,530 | Jones | July 15, 1952 |